(No Model.) 2 Sheets—Sheet 2.
J. W. BALET.
BRIDGE.
No. 495,621. Patented Apr. 18, 1893.
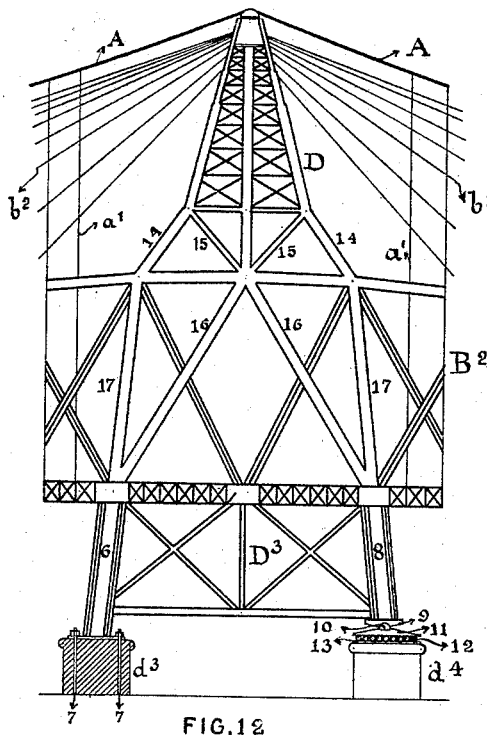
FIG.12
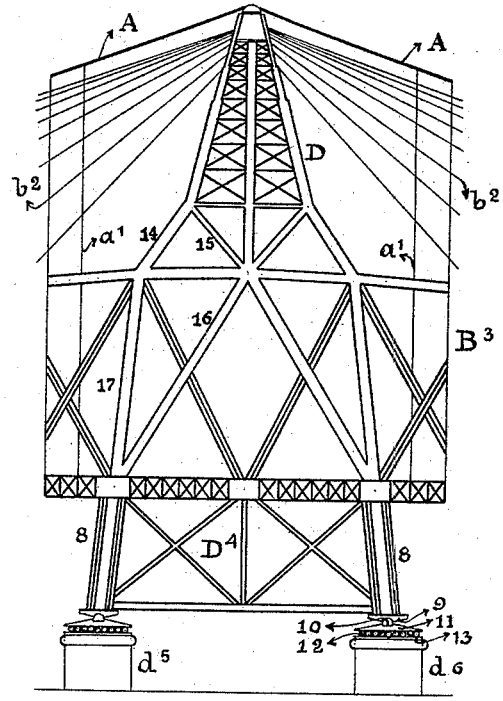
FIG.13
FIG.14.
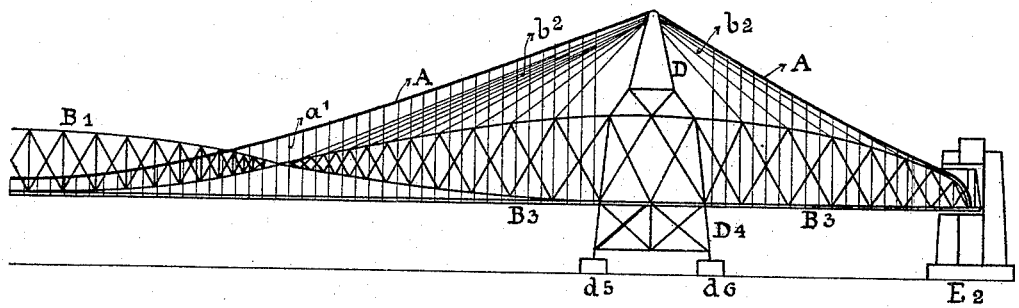
Inventor
Joseph W. Balet.

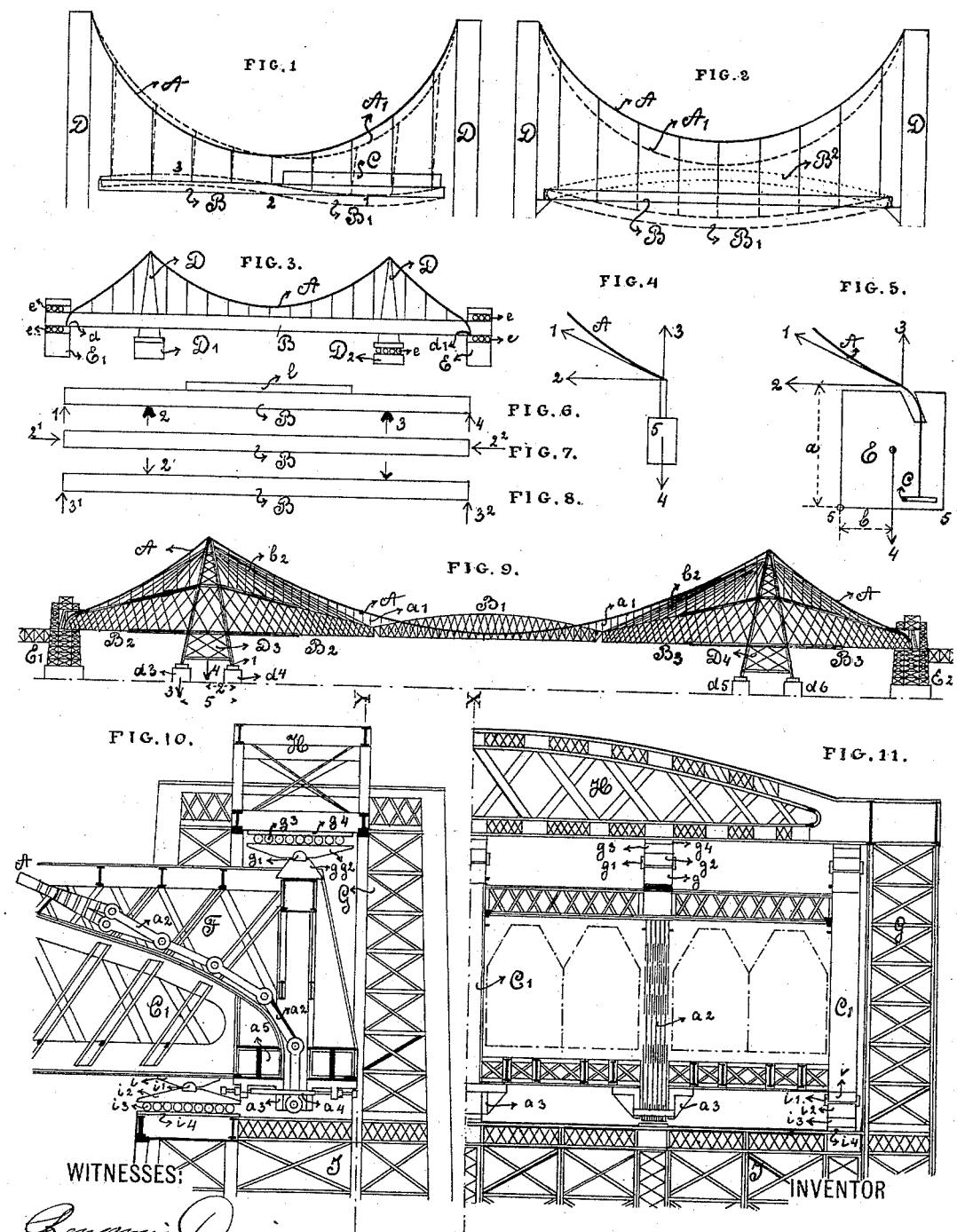

UNITED STATES PATENT OFFICE.

JOSEPH W. BALET, OF NEW YORK, N. Y.

BRIDGE.

SPECIFICATION forming part of Letters Patent No. 495,621, dated April 18, 1893.

Application filed July 5, 1892. Serial No. 438,921. (No model.)

*To all whom it may concern:*

Be it known that I, JOSEPH WILHELMUS BALET, a citizen of the United States, residing in the city, county, and State of New York, have invented a new and useful Improvement in Bridges, of which the following is a description, reference being had to the annexed drawings, in which—

Figure 1 is a sketch of a suspension bridge. Fig. 2 is a sketch of a suspension bridge. Fig. 3 is a sketch of a suspension bridge. Fig. 4 is a diagram of the forces at the anchorage of the suspension cable. Fig. 5 is a diagram of an anchorage of the suspension cable. Fig. 6 is a diagram of the forces of a moving load on the girder. Fig. 7 is a diagram of the forces occasioned by the suspension cable in the girder. Fig. 8 is a diagram of the forces occasioned by the suspension cable in the girder. Fig. 9 is an elevation of the combined system of the cantalever bridge, the suspension cable, the tension cables and the anchorage of the suspsnsion cable. Fig. 10 is an elevation and partly a section over the line X X in Fig. 11, giving a detailed view of the anchorage of the suspension cable to the girder. Fig. 11 is an elevation and partly a section over the line Y Y in Fig. 10, giving a detailed view of the anchorage of the suspension cable to the girder. Fig. 12 is an elevation on a larger scale of the anchored support of the cantalever and tower. Fig. 13 is an elevation on a larger scale of the sliding support of the cantalever and tower. Fig. 14 is a diagram on a larger scale of the system showing distinctly the members of which it is composed.

Till now the application of the suspension bridge has been very limited, and the cantalever bridge is now generally applied for bridging over large openings, notwithstanding the suspension cable is lighter, consequently cheaper, has a beautiful form, and allows to bridge over openings where every other system is an impossibility, the defects in the suspension system, are however, so serious that its adaptation is a matter of serious reflection. I will first describe these defects which will make my invention the clearer understood.

See Fig. 1. D are the towers on which the suspension cable A rests, and the girder B which carries the road bed is hung up to said cable. Now a load C is placed on girder B, then the cable A will accept the form A' under the pressure of this load and the girder B will accept the form B' and where the strongest bend in the girder has to be parted else it would break, therefore the girder is cut at 1, 2 and 3. The break 2 would occur when the load C is placed in the middle of the bridge. Now to prevent this bend the girder B has been given a certain height to be capable of carrying part of the moving load, in every instance however the girder had to be parted as is indicated in Fig. 1, with 1, 2 and 3; and a girder which is cut in three places has certainly little or no sustaining power and when heavy concentrated loads "as for instance in railroad traffic" come on the bridge the girder B sinks and rises like the waves, and a level road bed, "when a train is upon it" is impossible. (See the Niagara bridge.)

See Fig. 2. Now a combination of the girder with the suspension cable, "if such girder were given proper dimensions," would stop this undulatory motion; but now another and most serious defect prevents this combination, and makes the suspension bridge unfit for rapid transit. The letters and figures of reference in Fig. 2 are the same as in Fig. 1. Supposing the cable A and girder B being the level of the bridge in the coldest weather, then in the warmest weather the cable and girder have sunk as is indicated with A' and B'. Now to appreciate this difference I will state some figures. Supposing the width between the piers seventeen hundred feet, and the depth of the cable one hundred and sixty-five feet then the difference in height between the hottest and coldest weather is more than five feet. Now suppose the girder B being capable of supporting the moving load and the cable capable of supporting the weight of the girder and its own weight; then in the coldest weather the structure is rigid in form; but in the warm weather, "when the cable has sunk five feet lower," the girder is not supported by the cable, and when a load comes on same the girder has to support it alone and the structure will collapse. Now in practice care is taken that the girder never sinks so low that it becomes hollow, the same having an upward curve and in cold weather when five feet are added to this curve "through the contraction of the cable," the slope on the bridge becomes considerable, for which reason the trains are cut up before passing the Niagara bridge in cold weather, while the locomotive is not able to pull the whole train up against that slope. On the Brooklyn bridge the same phenomena shows itself in another form. When the traction cable does not run or is deranged, two locomotives are required to move the train up against the slope of the bridge in cold weather during business hours. This puts rapid transit out of the question, as may be seen on such occasions. Now my invention has the object to retain a level roadbed and the cable at the same height in any temperature, and to stiffen the roadbed so as to prevent any change in form. To stiffen the roadbed I use a combination system of suspension cable and girder and to retain the cable at the same height in any temperature, I anchor the cable to the girder and also place the towers on which the cable rests upon the girder.

See Fig. 4. A represents the cable at the anchorage and the arrow 1 represents the direction of the force in which the cable pulls. Now this force can be dissolved in a vertical force 3 and a horizontal force 2 and when I apply forces of the same power and in opposite direction said forces will balance each other. Now to balance the force 3 I hang on a weight 5 working in the direction 4. In the practical application, a pier standing on a good foundation represents this weight 5. The horizontal force 2 is taken up by the girder. In Fig. 3 is shown how this principle is applied. The girder B and the towers D form one structure. The girder B rides longitudinally inside the piers E, E' and over the pier $D^2$ on the rollers $e$, and is rigidly anchored to the pier D'. The cable A rests upon the towers D and is anchored to the girder B at $d$, $d'$ and now it does not require any explanation to prove that the cable retains the same height in any temperature, the towers receding from and approaching to each other corresponding with any change in temperature, also the anchorages of the cable recede from and approach each other under the same influence.

The usual manner of anchoring the cable is shown in Fig. 5. A is the cable, $c$ is the anchor plate and E is the pier. Now the weight of pier E balances the force 3. The force 2 has a tendency to dip the pier over with a leverage indicated by $a$ around the point 4, and this force is balanced by the force 4 which represents the weight of the pier E, said force 4 passing through the center of gravity of the pier E and having a leverage equal to C. In addition the friction of the pier E upon its foundation has to be considered, so that the force 2 does not slide the pier over the surface 5, 6. In Fig. 3 the girder B and the tower D above the pier $D^2$, may also ride over said pier. In that instance the girder B has to be kept rigidly in place at one of the land piers E or E'. In this case the cable may be anchored at that end of the bridge after the old principle illustrated in Fig. 5.

Calculation will show that no extra material is required in the girder B to take up the extra horizontal strain occasioned by the cable. Suppose the girder B constructed to withstand the strains of the moving load $l$, see Fig. 6 in which 1, 2, 3 and 4 are the points of support and B is the girder, then when the cable is anchored to the girder, said girder has also to be calculated to withstand the forces 2' and $2^2$, see Fig. 7, and the results of Figs. 6 and 7 are added to obtain the maximum strain in the girder B. When this addition is made, it shows that compressed or negative strains increase just as much as the pulling or positive strains decrease, consequently this manner of anchoring the cable does not require more material in the girder, but it requires another distribution of same.

Now I will describe some combinations of the system, which I have applied in my design for the Hudson River bridge and though the object of this patent is to protect the system I also add some mechanical details to make it more clearly understood. It is not necessary that the vertical strain of the cable be balanced by the pier E in Fig. 3. This strain may also be taken up by the girder B, in which instance to the strains of the girder as calculated in Figs. 6 and 7, the strains must be added when the girder is subjected to the forces 3' and $3^2$ in Fig. 8 in which instance 2 and 3 are the points of support of the girder B, the same representing the reaction "of the pressure of the cable upon the towers" upon the girder B, and the forces 3' and $3^2$ represent the vertical pull of the cable.

Part or all of the force described in the last paragraph may be transmitted through the girder from the anchorages $d$ and $d'$ to the towers above the piers D' and $D^2$. Later more on this subject. Which of these combinations is most economical or answers the purpose best, is only determined by the condition of the ground, the openings of the bridge, &c. For instance, when no land pier can be placed, it will still be feasible to build a suspension bridge. Suppose the place where the land pier should be, is a public thoroughfare, and the surface to build on limited, one of the combinations of the former paragraph will solve the problem. With this system two, three or more large openings may be bridged over.

It is a well known fact that heretofore the anchorage of the suspension cable as shown in Fig. 5 required a large mass of masonry to prevent the pier from dipping over or sliding under the influence of the force 2, and when this force is taken up by the girder without even an increase in material it means a great saving. This saving in material for the land piers of the Brooklyn bridge would have exceeded five hundred thousand dollars.

See Figs. 9 and 14. The strains on a bridge which tend to destroy it are two; one is its own weight which never changes, and this may be considered as a load upon the roadbed covering same from end to end, which load may be hung up to the suspension cable; the second is the moving load which occasions "as described in Fig. 1" the change in form of the suspension cable and as the object of this invention is to effectually stop that, the same is provided for by means of a cantalever girder, in other words: the suspension cable supports its own weight and the weight of the girder and the cantalever girder supports the moving load.

A is the cable, $B^2$ and $B^3$ are the cantalevers and $B'$ is a truss connecting the cantalevers, and I call $B^2$, $B'$, $B^3$, the cantalever girder, which girder is hung up to the cable with the suspenders $a'$. $D^3$ and $D^4$ support the cantalevers upon the piers $d^3$, $d^4$, $d^5$ and $d^6$ said supports forming one part with the cantalevers $B^2$ and $B^3$ and upon said cantalevers $B^2$ and $B^3$ rest the towers which support the cable A. The same is shown on a larger scale in Figs. 12 and 13.

As described in Fig. 3, when no tension or change of form in the bridge shall take place, "by change of temperature" the supports of the cable (the towers) and the anchorages of the cable must be able to approach to or recede from each other, and the same can be obtained by resting the towers upon the girder. The support $D^3$ is rigidly attached to the cantalever $B^2$. Said support has the leg 6 which is rigidly anchored with the anchors 7 to the pier $d^3$. To the leg 8 of said support is bolted the saddle 9, said saddle resting on the pivot 10. The pivot 10 rests in the saddle 11 and said saddle rests on the rollers 12, which rollers rest upon the bed plate 13, and said plate is anchored to the pier $d^4$. Now when the legs 6 and 8 approach to or recede from each other by expansion or contraction the leg 8 rides over the pier $d^4$.

In Fig. 13 the legs 8 of the support $D^4$ rest both on saddles as described in Fig. 12 and the support $D^4$ can ride over the piers $d^5$ and and $d^6$.

See Fig. 12. The tower D rests upon the cantalever $B^2$ by means of the braces 14 and 15, and the braces 16 and 17 which are members of the cantalever perform also the function of transmitting the downward pressure of the tower D direct to the legs 6 and 8. The same construction is shown in Fig. 13 and indicated with the same letters and figures of reference.

In Figs. 12 and 13 A is the suspension cable, $b^2$ are tension cables attached to the tower and cantalever and $a'$ are the suspenders which hang the cantalever up to the cable.

$E'$ and $E^2$ are the land piers.

$b^3$, $b^2$ are tension cables forming an additional connection between the cantalevers and towers, and relieving the same of a portion of the strain occasioned by the moving load.

The anchorage of the cable A is made to the cantalevers $B^2$ and $B^3$ as described before. Now in this structure the principle explained in Figs. 6, 7 and 8 is combined. The vertical upward pull of the cable at the anchorage is partly taken up by the pier $E'$, and partly transferred through the cantalever $B^2$ to the tower $D^3$. That portion of the force which is transferred to the tower $D^3$ tends to dip said tower over around the point 1, which is opposed first by the force 4 representing nearly one half of the weight of the bridge, and which force has a leverage 2; second the force 3 representing the weight of the pier $d^3$ working at a leverage 5. A division is made in this manner because at that side of the river being the Jersey side the piers $d^3$ and $d^4$ have to be sunk very deep to strike a rock bottom, "and the mass of material being required for that purpose," it may be made useful in this manner.

The tension cables have a triple object first to relieve the cantalevers of part of the strain occasioned by the moving load, so that the weight of the cantalever approaches as near as possible to a uniform weight per foot; second to facilitate the work of mounting the structure and third because the same saves considerable quantity of steel.

See Figs. 10 and 11, in which A is the suspension cable, $C'$ is the end of the girder and G the land pier. The suspension cable A is connected with the chain $a^2$ and said chain wedged rigidly with the wedges $a^3$ to the base plate $a^4$ which is bolted to the frame work $a^5$ of the girder $C'$. On the top of this girder is built a horizontal extension F to which the saddles $g$ are screwed. In these saddles rest the pivots $g'$ upon which the saddles $g^2$ rest. Upon the saddles rest the rollers $g^3$. On the steel pier I is built the extension G, said extensions being also built on the pier at the lateral sides of the girder $C'$, and the truss H is rigidly held by them. Said truss has flat surfaces $g^4$ corresponding with the saddles and the rollers $g^3$ rest against them. Also at the bottom of the truss $C'$ are attached the saddles $i$ and these rest on pivots $i'$ said pivots resting on the saddles $i^2$. The saddles $i^2$ rest on the rollers $i^3$ which are supported by the bearing plates $i^4$ which plates are bolted to the pier I. Now when the girder $C'$ expands or contracts, it will roll freely inside the pier I and its extension G and against the truss H. The girder H carries the upward strain occasioned by the cable A, and the pier I carries the positive load (the reaction of a moving load upon $C'$).

The advantages claimed are: First. That this system will rigidly retain its form. Second. That this system will withstand the wildest hurricanes. Third. That this system will economize very largely in building expenses for the land piers as formerly described and as a consequence of this. Fourth, a large saving of expenses for the foundation. Fifth. The possibility of bridging over openings where every other system is impossible.

Sixth. The level of the roadbed is the same in any temperature. Seventh. The form of the bridge is very pleasing to the eye which cannot be said of many other systems. Eighth. The form of the bridge being pleasing to the eye it will enhance the beauty of any place where it is built, the material required for a span of two hundred and fifty feet being equal to that of a girder of eighty feet. This system is not only the best for bridging over rivers, it is also the best for elevated railroads, as it does not cost more than any present system and increases the beauty of a city where the present system destroys it. Ninth. It is the lightest and consequently the cheapest of any system, to understand which I will cite some figures. The Firth of Forth bridge which is a cantalever has two tracks, is five thousand four hundred feet long, and required forty-two thousand tons of steel for its construction—that is 3.8 tons per foot per track. The Hudson river bridge is long, four thousand five hundred feet, has eight tracks and requires thirty-three thousand tons of steel for its construction—that is seven-eighths of a ton per foot per track. With the above figures it requires no argument to prove that the Hudson river bridge could not be constructed as a cantalever bridge, with two tons of steel per foot per track, but supposing this possible it would make its weight seventy-three thousand tons which is a difference of forty thousand tons, the same being equal to four million dollars.

Having fully described my invention, what I claim as new, and desire to protect by Letters Patent, is—

1. In a suspension bridge with a cantalever girder to stiffen the roadbed, towers resting upon said cantalevers, a suspension cable supported by said towers and anchored to said girder and vertical suspenders between the suspension cable and said girder.

2. In a suspension bridge with a cantalever girder to stiffen the roadbed, towers resting upon the cantalevers, tension cables between the towers and cantalevers, and a suspension cable supported by said towers and anchored to said girder.

3. In a suspension bridge with a cantalever girder to stiffen the roadbed, towers resting upon the cantalevers, a suspension cable supported by said towers and anchored to said girder, the towers with the cantalevers and also the anchorages being capable of receding from and approaching to each other according to changes in temperature.

4. In a suspension bridge with a cantalever girder to stiffen the roadbed and towers resting upon the cantalevers, a suspension cable supported by said towers and anchored to said girder, suspenders between the suspension cable and the girder, said anchorages and also said cantalevers with the towers being capable of receding from and approaching to each other according to changes in temperature.

5. In a suspension bridge a cantalever girder to stiffen the roadbed, towers resting upon said cantalevers, a suspension cable supported by said towers and anchored to said girder, suspenders between said girder and the suspension cable, tension cables between the towers and the cantalevers, the cantalevers with the towers and also the anchorages being capable of receding from and approaching to each other according to changes in temperature.

6. In a suspension bridge a girder to stiffen the roadbed, towers resting upon said girder, tension cables between said towers and the girder, a suspension cable supported by said towers and anchored to said girder and suspenders between said girder and the suspension cable.

7. In a suspension bridge a girder to stiffen the roadbed, towers resting upon said girder, a suspension cable supported by said towers and anchored to said girder, tension cables between said towers and said girder, suspenders between the suspension cable and the girder, the towers and also the anchorages being capable of receding from and approaching to each other according to changes in temperature.

8. In a combination bridge system of suspension cable and girder, in which the suspension cable is anchored to the girder, the combination therewith of abutments in which the girder enters, said abutments being capable of taking up the vertical upward strain and allowing said girder to move in a longitudinal direction all substantially as specified.

9. In a bridge in which the ends above the abutments are subjected to an upward strain, a fixed upper bearing for the girder upon the abutments to resist said upward strain.

10. In a bridge a fixed upper bearing "for the cantalevers" upon the abutments to resist the upward strain of the ends of the cantalevers.

11. In a bridge the combination of the following elements, a girder, a suspension cable supported by towers and anchored to said girder, and fixed upper bearings upon the abutments which resist the upward strain of the bridge at said abutments.

12. In a bridge the combination of the following elements, a girder, a suspension cable supported by towers and anchored to said girder, suspenders between the suspension cable and the girder, and fixed upper bearings upon the abutments which resist the upward strain of the bridge at said abutments.

13. In a bridge the combination of the following elements, a girder, a suspension cable supported by towers and anchored to said girder, suspenders, tension cables and fixed upper bearings upon the abutments which resist the upward strain of the bridge at said abutments.

14. In a suspension bridge a girder and a suspension cable anchored to said girder in combination with fixed upper bearings for the ends of said girder, said bearings being capable to withstand the upward strain of the anchorages and allow a free longitudinal motion of the girder.

15. In a suspension bridge the combination of the following elements, a girder, towers, a suspension cable resting upon said towers and anchored to said girder, suspenders, and fixed upper bearings for said girder, the anchorages being capable of approaching toward or receding from each other.

16. In a suspension bridge the combination of a girder, towers, a suspension cable resting upon said towers and anchored to said girder and fixed upper bearings for said girder, the towers and the anchorages being capable of approaching toward or receding from each other.

JOSEPH W. BALET.

Witnesses:
ERNST LEIBER,
GEO. JOBSON.